United States Patent
Franceschini et al.

(10) Patent No.: US 8,472,966 B2
(45) Date of Patent: Jun. 25, 2013

(54) METHOD OF OPERATING A WIRELESS COMMUNICATIONS NETWORK, AND WIRELESS COMMUNICATIONS NETWORK IMPLEMENTING THE METHOD

(75) Inventors: Daniele Franceschini, Turin (IT); Carlo Eynard, Turin (IT); Valerio Bernasconi, Turin (IT); Andrea Calvi, Turin (IT); Davide Sorbara, Turin (IT)

(73) Assignee: Telecom Italia S.p.A., Milan (IT)

( * ) Notice: Subject to any disclaimer, the term of this patent is extended or adjusted under 35 U.S.C. 154(b) by 561 days.

(21) Appl. No.: 12/087,266

(22) PCT Filed: Dec. 30, 2005

(86) PCT No.: PCT/EP2005/014139
§ 371 (c)(1),
(2), (4) Date: Nov. 4, 2008

(87) PCT Pub. No.: WO2007/076881
PCT Pub. Date: Jul. 12, 2007

(65) Prior Publication Data
US 2009/0075669 A1 Mar. 19, 2009

(51) Int. Cl.
*H04W 4/00* (2009.01)
(52) U.S. Cl.
USPC .............. 455/452.1; 455/414.1; 370/395.21
(58) Field of Classification Search
USPC ...................................................... 455/452.2
See application file for complete search history.

(56) References Cited

U.S. PATENT DOCUMENTS

| | | | |
|---|---|---|---|
| 6,298,383 B1 * | 10/2001 | Gutman et al. .............. 709/229 |
| 6,466,802 B1 * | 10/2002 | Blakeney et al. .......... 455/552.1 |
| 6,522,883 B2 * | 2/2003 | Titmuss et al. .............. 455/445 |
| 6,628,954 B1 * | 9/2003 | McGowan et al. ........... 455/461 |
| 6,665,280 B2 * | 12/2003 | Forssell et al. ............... 370/329 |
| 6,765,918 B1 * | 7/2004 | Dixon et al. ................. 370/401 |
| 6,839,356 B2 * | 1/2005 | Barany et al. ................ 370/401 |

(Continued)

FOREIGN PATENT DOCUMENTS

| WO | WO 03/103235 A1 | 12/2003 |
|---|---|---|
| WO | WO 2004/029854 A2 | 4/2004 |
| WO | WO 2004/100595 A1 | 11/2004 |

OTHER PUBLICATIONS

3GPP TSG CN Meeting #14, "Introduction of GERAN feature indicator", XP-002396352, Tdoc NP-010690, Ericsson, pp. 1-16, (2001).

(Continued)

*Primary Examiner* — Hai V Nguyen
(74) *Attorney, Agent, or Firm* — Finnegan, Henderson, Farabow, Garrett & Dunner, L.L.P.

(57) ABSTRACT

A method of operating a wireless communications network is adapted to provide services to users exploiting a first and a second different radio communications technologies, for example, an enhanced general packet radio service network. The method includes: providing, in a user profile available at the network, a subscription indication adapted to indicate that the user has subscribed for being provisioned with the network services through the first radio communication technology, upon reception by the network of a capability indication from the user adapted to indicate to the network that the user supports the first radio communications technology, looking up the user profile for the presence of the subscription indication; and in case the subscription indication is not found, handling the user as if supporting the second radio communications technology but not the first radio communications technology.

25 Claims, 4 Drawing Sheets

U.S. PATENT DOCUMENTS

| | | | |
|---|---|---|---|
| 6,870,858 B1* | 3/2005 | Sebire | 370/514 |
| 6,874,029 B2* | 3/2005 | Hutcheson et al. | 709/227 |
| 6,996,092 B1* | 2/2006 | Maguire et al. | 370/356 |
| 7,050,824 B2* | 5/2006 | Masseroni et al. | 455/522 |
| 7,082,103 B2* | 7/2006 | Schieder et al. | 370/231 |
| 7,099,675 B2* | 8/2006 | Keutmann et al. | 455/456.1 |
| 7,126,940 B2* | 10/2006 | Vanttinen et al. | 370/352 |
| 7,151,941 B2* | 12/2006 | Vanttinen et al. | 455/456.2 |
| 7,200,125 B2* | 4/2007 | Lohtia et al. | 370/329 |
| 7,224,977 B2* | 5/2007 | Cavalli et al. | 455/452.1 |
| 7,403,779 B2* | 7/2008 | De Cambray-Mathan | 455/446 |
| 7,433,929 B2* | 10/2008 | Guilford et al. | 709/217 |
| 7,436,843 B2* | 10/2008 | Gustafsson et al. | 370/401 |
| 7,471,655 B2* | 12/2008 | Gallagher et al. | 370/329 |
| 7,623,843 B2* | 11/2009 | Squibbs | 455/407 |
| 7,627,680 B2* | 12/2009 | Hutcheson et al. | 709/228 |
| 7,649,848 B1* | 1/2010 | Swan et al. | 370/252 |
| 7,680,933 B2* | 3/2010 | Fatula, Jr. | 709/226 |
| 7,710,964 B2* | 5/2010 | Patil et al. | 370/392 |
| 7,787,884 B2* | 8/2010 | Muniere | 455/452.2 |
| 7,801,105 B2* | 9/2010 | Larsson et al. | 370/347 |
| 7,805,126 B2* | 9/2010 | Koskinen et al. | 455/406 |
| RE41,811 E* | 10/2010 | Gutman et al. | 709/229 |
| 7,817,999 B2* | 10/2010 | Tang et al. | 455/432.1 |
| 7,835,275 B1* | 11/2010 | Swan et al. | 370/229 |
| 7,869,819 B2* | 1/2011 | Noldus | 455/461 |
| 7,882,229 B2* | 2/2011 | Bernoth | 709/225 |
| 7,904,088 B2* | 3/2011 | Rexhepi et al. | 455/439 |
| 7,962,632 B2* | 6/2011 | Lipsanen | 709/229 |
| 7,996,017 B2* | 8/2011 | Vanttinen | 455/456.2 |
| 2001/0009544 A1* | 7/2001 | Vanttinen et al. | 370/338 |
| 2001/0043577 A1* | 11/2001 | Barany et al. | 370/328 |
| 2001/0046879 A1* | 11/2001 | Schramm et al. | 455/525 |
| 2002/0061743 A1* | 5/2002 | Hutcheson et al. | 455/426 |
| 2002/0065081 A1* | 5/2002 | Barany et al. | 455/450 |
| 2002/0068592 A1* | 6/2002 | Hutcheson et al. | 455/501 |
| 2002/0072376 A1* | 6/2002 | Carlsson et al. | 455/456 |
| 2002/0089949 A1* | 7/2002 | Bjelland et al. | 370/331 |
| 2002/0114279 A1* | 8/2002 | Eriksson | 370/235 |
| 2002/0145987 A1* | 10/2002 | Carlsson et al. | 370/329 |
| 2003/0054850 A1* | 3/2003 | Masseroni et al. | 455/522 |
| 2003/0072267 A1* | 4/2003 | Lohtia et al. | 370/252 |
| 2003/0190917 A1* | 10/2003 | De Cambray-Mathan | 455/446 |
| 2004/0047437 A1* | 3/2004 | Hamiti et al. | 375/326 |
| 2004/0072578 A1 | 4/2004 | Keutmann et al. | |
| 2004/0100920 A1* | 5/2004 | Ball et al. | 370/318 |
| 2004/0132441 A1* | 7/2004 | Livet et al. | 455/422.1 |
| 2004/0151156 A1* | 8/2004 | Noel et al. | 370/349 |
| 2004/0157616 A1* | 8/2004 | Muniere | 455/452.2 |
| 2004/0162105 A1* | 8/2004 | Reddy et al. | 455/551 |
| 2004/0203775 A1* | 10/2004 | Bourdeaut et al. | 455/435.1 |
| 2004/0218605 A1 | 11/2004 | Gustafsson et al. | |
| 2005/0026616 A1* | 2/2005 | Cavalli et al. | 455/436 |
| 2005/0099990 A1* | 5/2005 | Uusikartano et al. | 370/349 |
| 2005/0143086 A1* | 6/2005 | Schwarz | 455/452.2 |
| 2005/0169235 A1* | 8/2005 | Hutcheson et al. | 370/350 |
| 2005/0215246 A1* | 9/2005 | Soderbacka et al. | 455/426.1 |
| 2005/0216700 A1* | 9/2005 | Honary et al. | 712/15 |
| 2006/0092877 A1* | 5/2006 | Niemela | 370/330 |
| 2006/0140160 A1* | 6/2006 | Vendel et al. | 370/337 |
| 2006/0165027 A1* | 7/2006 | Heden | 370/328 |
| 2006/0291416 A1* | 12/2006 | Rexhepi et al. | 370/331 |
| 2007/0021133 A1* | 1/2007 | Coulas | 455/518 |
| 2007/0047523 A1* | 3/2007 | Jiang | 370/352 |
| 2009/0023458 A1* | 1/2009 | Mountney | 455/456.1 |
| 2009/0075669 A1* | 3/2009 | Franceschini et al. | 455/452.2 |
| 2010/0173695 A1* | 7/2010 | Hutcheson et al. | 463/23 |

OTHER PUBLICATIONS

3$^{rd}$ Generation Partnership Project; Technical Specification Group GSM EDGE Radio Access Network; General packet Radio Service (GPRS); Bas Station System (BSS)-Serving GPRS Support Node (SGSN); BSS GPRS Protocol (BSSGP), (Release 1999) pp. 1-71, 3GPP TS 08.18 V8.12.0 (2004).

3$^{rd}$ Generation Partnership Project; Technical Specification Group Services and System Aspects; Quality of Service (QoS) concept and architecture, (Release 6), pp. 1-40, 3GPP TS 23.107 V6.3.0 (2005).

3$^{rd}$ Generation Partnership Project; Technical Specification Group Core Network and Terminals; Mobile radio interface Layer 3 specification; Core network protocols; Stage 3, (Release 6), pp. 1-526, 3GPP TS 24.008 V6.11.0 (2005).

* cited by examiner

METHOD OF OPERATING A WIRELESS COMMUNICATIONS NETWORK, AND WIRELESS COMMUNICATIONS NETWORK IMPLEMENTING THE METHOD

BACKGROUND OF THE INVENTION

1. Field of the Invention

The present invention generally relates to the field of wireless communications networks, particularly but not exclusively to mobile telephony networks (Public Land Mobile Networks—PLMNs), even more particularly second-generation (2G) PLMNs like those complying with the GSM (Global System for Mobile communications) standard and, specifically, to 2.5G PLMNs, i.e. 2G PLMNs enhanced with GPRS (General Packet Radio Service) and EDGE (Enhanced Data rates for Global Evolution) technologies, including the so-called EGPRS (Enhanced GPRS) PLMNs. Specifically, the invention relates to a method for discriminating users in the provisioning of network services, and to a PLMN implementing the method.

2. Description of Related Art

Mobile telephony networks, initially conceived for enabling voice communications, similar to the wired, Public Switched Telephone Networks (PSTNs), but between mobile users, have experienced an enormous spread, especially after the introduction of 2G mobile telephony networks, and particularly digital mobile cellular networks such as those complying with the GSM standard (and counterpart standards).

However, these 2G cellular networks, albeit satisfactory for voice communication, offer limited, non-versatile and non-cost effective data exchange capabilities.

Similarly to the plain old PSTNs, 2G mobile telephony networks are in fact Circuit-Switched (CS) networks, which offer limited bandwidth that can be allocated for a given user due to the constraints to the A interface (GSM interface between the BSS Base Station Subsystem—and the MSC—Mobile Switching Center), based on 64 kbps data transfer. On the contrary, data communications networks, such as computer networks and, among them, the Internet, adopt Packet-Switched (PS) schemes (they are also referred to as packet data networks), which allow much higher data transfer rates.

Some solutions have been proposed to overcome the limitations of conventional, CS mobile telephony networks such as the GSM networks, so as to enable users of mobile terminals (hereinafter, mobile stations) efficiently exploiting services offered through the Internet or other packet data networks.

One of the solutions that has gained great popularity is GPRS, a digital mobile radio service compatible with the GSM standard architecture, which requires the deployment of new nodes in the core network, namely the SGSN (Serving GPRS Support Node) and the GGSN (Gateway GPRS Support Node). GPRS enables more radio-versatile and cost-effective data transfer at a speed which may be higher than that allowed by pure GSM. Essentially, GPRS can be viewed as a GSM add-up that supports and enables packet-based data communication, and is a ready-at-hand solution for enhancing the data exchange capabilities of already existing GSM networks. As far as the radio frequency layer is concerned, GPRS completely relies on the GSM standard, preserving also the base-band burst formatting and the Gaussian Minimum Shift Keying (GMSK) modulation scheme adopted in the GSM standard.

A further enhancement of the transmission rate and of the efficiency of use of the licensed spectrum is represented by the EDGE technology, which is a step forward before the introduction of Wideband Code Division Multiple Access (WCDMA) systems adopted in third-generation (3G) mobile telephony networks like those complying with the Universal Mobile Telecommunications System (UMTS) standard. The EDGE technology introduces another modulation technique, i.e. 8-PSK (8-state Phase Shift Keying) and new channel coding schemes, which can be used to transmit both PS data and CS voice and data services.

The performances of GSM networks enhanced with GPRS and EGPRS (Enhanced GPRS) are such that they are for the moment not expected to be rendered obsolete by introduction of WCDMA networks, rather a coexistence of the two types of networks is believed to be most probable, even in more advanced stages of the deployment of WCDMA networks. For example, network operators not in possession of a license for WCDMA transmissions may find in EGPRS deployment a way to stay in the business, or EGPRS networks may provide coverage in geographic areas wherein a coverage by a WCDMA network is not practical or not cost-effective.

The EGPRS functionality relies on the same architecture as GPRS does. In spite of the changes to the radio interface, the same layer structure for signaling and data as for GPRS has been retained for EGPRS. In particular, the logical channels that have been introduced for GPRS are reused for EGPRS. Data is still transferred over PDTCH (Packet Data Traffic CHannel), whereas associated signaling is transmitted over PACCH (Packet Associated Control CHannel). The broadcast and control channels are also the same.

In EGPRS networks, the link quality control functionality has a fundamental role. In EGPRS, nine MCSs (Modulation and Coding Schemes) are introduced. The lowest numbered 4 MCSs are characterized by the use of GMSK modulation, while the 5 highest numbered MCSs use the 8-PSK modulation scheme. The link quality control functionality allows the full exploitation of the radio capability, by selecting the most appropriate MCS depending on the measurements of the radio quality performed by the terminal and reported to the network, and performed by the network itself.

An advantage of EGPRS networks is that they are able to support EGPRS-capable mobile stations, while retaining the capability of supporting GPRS-capable only mobile stations as well. Throughout the present document, by EGPRS-capable mobile station is intended to refer to a mobile station that is capable of accessing both GPRS and EGPRS network services. By GPRS-capable mobile station it is instead intended to refer to a mobile station that supports GPRS only.

From the radio bearer viewpoint, EGPRS-capable mobile stations may benefit from the use of 8-PSK radio bearers, whereas GPRS-capable mobile stations can only be allocated on GMSK radio bearers. Thanks to the enhanced data transfer capabilities offered by the EDGE technology, EGPRS networks are in principle capable of offering high Quality of Service (QoS).

Control of the QoS is an issue already faced in the art.

For example, the International application WO 2004/029854, entitled "Enhanced QoS control", discloses a method for providing services to a user equipment, including providing a policy decision entity with subscriber information (regarding permitted conditions for the users to obtain the services) retrieved from a database; providing service information from at least one network or server, regarding service offered by the at least one network or server to the user equipment, forming policy rules at the policy decision entity based upon the subscriber information and the service information. A requesting user equipment transmits a request for service to the communications network; such request is processed by the policy decision entity in accordance with the policy rules to determine whether the service is to be allowed and, if the service is allowed, characteristics of the service to be provided to the requesting user equipment. The policy enforcement entity enforces at least one characteristic of an allowed service upon the communication network to ensure that the allowed service obtained by the requesting user equipment has the at least one characteristic of the allowed service.

The International application WO 2004/100595, entitled "Service restriction in mobile communication networks", describes solutions that enable 3 G operators to identify the location of their subscribers (at a country level), the serving operator name and the access technology (i.e., 2.5G or 3G) supported by the serving network, so as to control access to contents/services taking into account rights and legal restrictions applicable outside the home country and the level of QoS provided by the serving network.

SUMMARY OF THE INVENTION

The Applicant has observed that despite the high potential of EGPRS networks, the QoS perceived by the users may in practice result far less than the theoretical one.

An EGPRS Radio Access Network (GSM/EDGE RAN or GERAN) typically allocates the EGPRS-capable mobile stations on EGPRS radio resources, but in case of congestion, the GERAN may allocate some of the EGPRS-capable mobile stations on the GPRS radio resources. In other words, an EGPRS-capable mobile station may be multiplexed with other EGPRS-capable mobile stations and also with GPRS-capable mobile stations. In case the EGPRS-capable mobile station is allocated on a GPRS radio resource, the QoS perceived by the user is significantly lower compared to the QoS that would be perceived in case the EGPRS-capable mobile station were allocated on an EGPRS radio resource. Moreover, the perceived QoS further reduces with the increase in the population of GPRS-capable mobile stations multiplexed on the same radio resource.

The Applicant has also observed that the problem of a low perceived QoS also arises even in respect of the EGPRS radio resources. As far as possible, the GERAN tries to allocate EGPRS-capable mobile stations on the EGPRS radio resources, according to the Radio Resource Management (RRM) policies that are implemented in the BSC (Base Station Controller) in order to optimize the use of the radio resources. The Applicant has observed that this is currently an obstacle against the possibility of implementing policies of restriction of the user access to high-value network services like those potentially made possible by EGPRS, based for example on specific subscription (and payment). Currently, the network is not capable of doing such a discrimination, thereby when a mobile station is recognized to be EGPRS-capable, the GERAN tries to allocate it on EGPRS radio resources, regardless of the fact that the owner user is or is not a subscriber of the EGPRS network services.

The Applicant has tackled the problem of increasing the QoS perceived by the users.

In particular, the Applicant has faced the problem of how the network operator can ensure that the users equipped with EGPRS-capable mobile stations, and possibly having subscribed or paying for a given EGPRS network service, perceive a QoS that is not affected by the simultaneous presence of other users not equipped with EGPRS-capable mobile stations, or not having subscribed for the EGPRS service.

The Applicant has found that the problem can be solved by providing, at the network side, subscription indications adapted to make the network aware of whether a certain user has subscribed for enjoying network services furnished through a certain high data rate radio communications technology, like EGPRS, and by conditioning the assignment of radio resources to the user not only to the radio capability indication provided by the user, but also to the subscription indications.

According to a first aspect of the present invention, a method as set forth in appended claim 1 is proposed, for operating a wireless communications network adapted to provide services to users exploiting a first and a second different radio communications technologies; the method comprises:

providing, in a user profile available at the network, a subscription indication adapted to indicate that the user has subscribed for being provisioned with the network services through said first radio communication technology;

upon reception by the network of a capability indication from the user adapted to indicate to the network that the user supports said first radio communications technology:

looking up the user profile for the presence of said subscription indication, and in case the subscription indication is not found, handling the user as if supporting said second radio communications technology but not said first radio communications technology.

According to another aspect of the present invention, a wireless communications network as set forth in claim 15 is provided, adapted to provide services to users exploiting a first and a second different radio communications technologies, comprising:

a user profile comprising a subscription indication adapted to indicate that the user has subscribed for being provisioned with the network services through said first radio communication technology;

wherein the network, upon reception of a capability indication from the user indicating to the network that the user supports said first radio communications technology, is adapted to:

look up the user profile for the presence of said subscription indication, and in case the subscription indication is not found, handle the user as if supporting said second radio communications technology but not said first radio communications technology.

BRIEF DESCRIPTION OF THE DRAWINGS

The features and advantages of the present invention will be made clear by the following detailed description of an embodiment thereof, provided merely by way of exemplary and non-limitative example, description that will be conducted making reference to the attached drawings, wherein.

DETAILED DESCRIPTION OF THE PREFERRED EMBODIMENT

Figure 1:
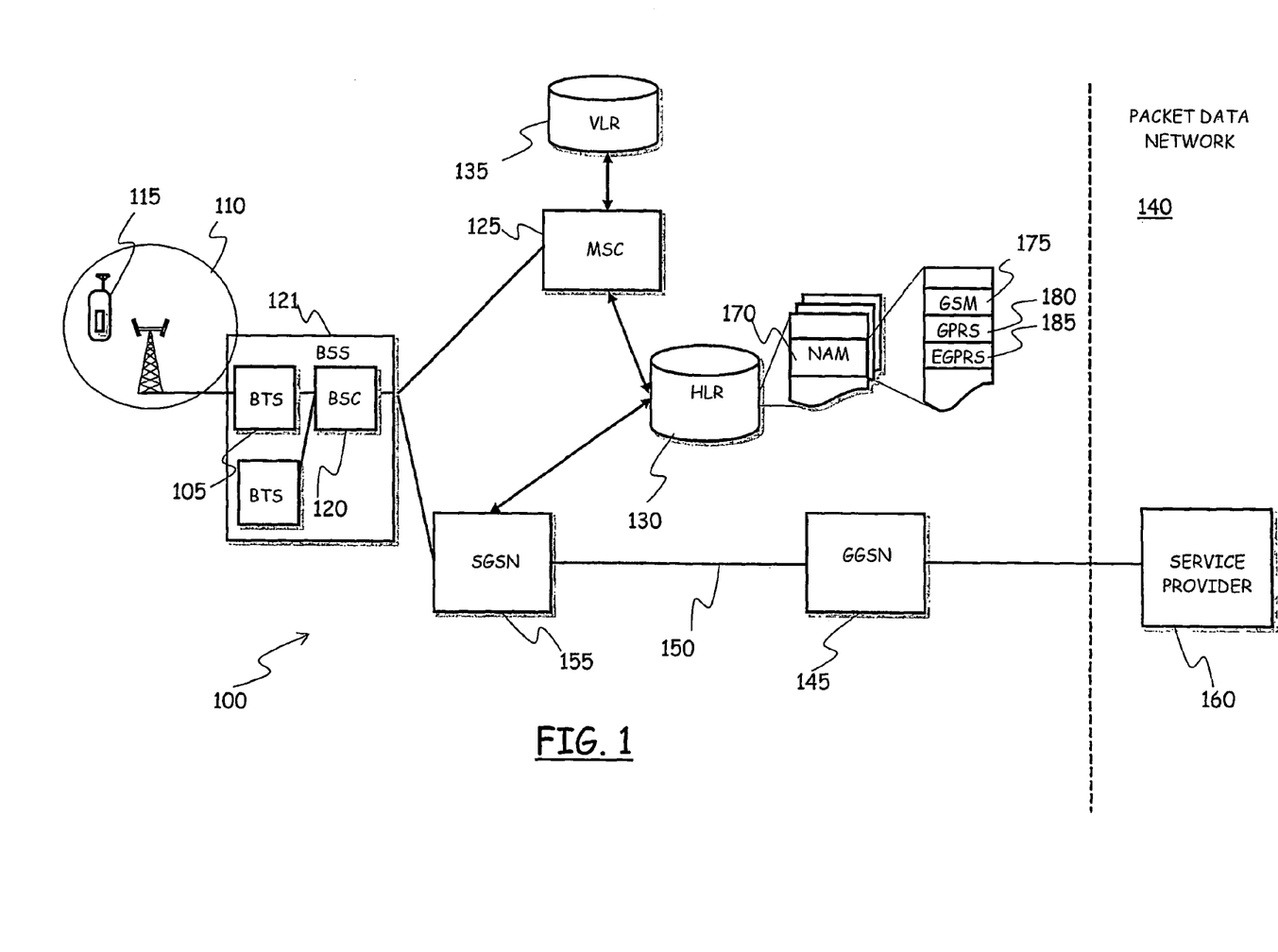
FIG. 1 schematically shows the architecture of a GPRS/EGPRS network wherein a method according to an embodiment of the present invention is advantageously implemented.

Referring to the drawings, FIG. 1 shows, schematically and limitedly to the elements essential for the understanding of the invention embodiment being described, the architecture of a mobile telephony network (PLMN) 100, according to an embodiment of the present invention, particularly a GPRS/EGPRS PLMN 100.

In a way per-se known in the art, the PLMN 100 includes a plurality of Base Station Subsystems (BSSs) 121 shown in FIG. 1, each one providing coverage and radio resource management for mobile communications in a respective geographic region.

The generic BSS comprises a plurality of Base Transceiver Stations (BTSs), like the exemplary BTS 105 shown in FIG. 1 and one Base Station Controller (BSC) 120 shown in FIG. 1; each BTS covers a respective area, typically referred to as a "cell", within the region covered by the BSS; in the drawing, the cell covered by the BTS 105 is schematically depicted as an encircled area denoted as 110.

The generic BTS communicates with, i.e. it handles the transmission/reception of radio signals to/from the user mobile communications terminals, e.g. mobile phones or mobile stations which are located in the BTS's cell; for example, the BTS 105 communicates with a mobile station 115, located in the cell 110.

Typically, several BTSs are connected to and controlled by a same Base Station Controller (BSC), like the BSC 120 shown in the drawing; the BSC is a radio access network unit that, roughly speaking, instructs the controlled BTSs about specified physical radio frequency channels over which the information to be transmitted to/received from the mobile stations is conveyed via logical channels. The BTSs and the parenting BSC form the BSS 121 of the PLMN. In particular, being the PLMN 100 a GPRS/EGPRS PLMN, the RAN is a GERAN, supporting both the GMSK modulation, typical of, but not limited to, the GSM standard, and the 8-PSK modulation, specific of the EDGE technology.

Groups of different BSSs are connected to respective Mobile Switching Centers (MSCs), like the MSC 125; the generic MSC performs the function of switching to other MSCs of the same PLMN (a generic PLMN may include several MSCs, distributed across the territory covered by the network), and to the MSCs of other PLMNs, of different network operators (for example, to allow users subscribers of the PLMN 100 to roam in other PLMNs), and to the exchanges of one or more PSTNs.

The generic MSC interacts with a network's Home Location Register (HLR) 130, and with a local Visitor Location Register (VLR) 135. The HLR 130 contains subscription data of users that are subscribers of the PLMN 100, particularly mobile phone numbers, users' profiles. The VLR 135 contains instead information about the users (either subscribers of the PLMN 100, or subscribers of other PLMNs) who, at a current time, are registered to the PLMN 100 and are located in the geographic area controlled by the respective MSC 125. Based on the information stored in the HLR and VLR, the generic MSC is capable of switching, i.e. properly routing calls from callers to called users.

The PLMN 100 further includes, in addition to the CS network infrastructure, a GPRS network infrastructure for PS communications, for example allowing users of mobile stations accessing services offered by service providers in one or more packet data networks, such as the Internet and/or an Intranet, more generally any data communications network in which data is exchanged in packets, i.e. according to a packet-switched scheme instead of a circuit-switched one, particularly but not limitedly any network adopting the Internet Protocol (IP), like the exemplary service provider 160 of the packet data network 140.

FIG. 1 schematically depicts core network elements that, according to the GPRS standard, enable the mobile stations connected to the PLMN 100 to access an external packet data network.

Without entering into excessive details, known per-se in the art, at least one Gateway GPRS Support Node (GGSN) 145 is provided to act as an interface between the PLMN 100 and the external packet data network 140. The GGSN 145 exchanges data, through a GPRS backbone network 150, with one or more Serving GPRS Support Nodes (SGSNs), such as the SGSN 155 shown in the drawing. The generic SGSN is associated with one or more respective BSSs, and routes the data received, through the GGSN (or one of the GGSNs, if more than one GGSN exists) and the GPRS backbone network, from the external packet data network (or one of the external packet-based communications networks), to the proper destination mobile stations, located in the geographic area covered by the respective BSS (or by one of the respective BSSs); for example, the SGSN 155 routes the data received, through the GGSN 145 and the GPRS backbone network 150, from the external packet data network 140 to the mobile station 115. The same applies in the opposite direction for the mobile-originated packet data transfer.

In particular, the generic SGSN keeps track of the geographical location of the mobile stations, so as to know where the data is to be routed in order to be delivered to the intended destination.

The users equipped with mobile stations supporting GPRS can take advantage of the GPRS infrastructure, and for example exploit the PS services offered by the service provider 160 in the packet data network 140.

Conventionally, the procedure for enabling the user of a generic mobile station to exploit services provided by a service provider like the service provider 160, accessible through the packet data network 140, essentially involves two steps: a first step (called Packet Data Protocol—PDP—context activation) in which a network address (typically an IP address) is assigned to the mobile station and a logical connection (the PDP context) is created between the GPRS mobile station and the GGSN; and a second step (called Temporary Block Flow—TBF—establishment/release) in which the PLMN 100 assigns the mobile station physical communication resources, namely radio resources for transmission or reception "over the air", on the radio link portion of the PLMN 100.

In particular, without entering into excessive details well known to those skilled in the art, the mobile station, after having registered at the SGSN serving the cell in which the mobile station is located at that moment, sends to the SGSN/GGSN a request for activation of a PDP context. The PDP context request triggers a PDP context activation procedure in which the GPRS mobile station, the SGSN and the GGSN exchange information useful to negotiate PDP context parameters. The PDP context activation procedure results in the definition of a data transfer path between the GGSN and the BTS that covers the cell in which the mobile station is located. A PDP context is thus created.

The activation of the PDP context does not involve per-se the allocation of physical communication resources of the PLMN 100, but merely establishes a logical connection between the mobile station and the server; thus, the PDP context, once activated, may be kept active for hours, in principle forever, even when there is no data to be exchanged between the service provider and the mobile station, until the latter, or, possibly, the service provider, deactivates it.

After the PDP context has been activated, the BSC checks whether there is data received from the GGSN/SGSN to be transmitted to the mobile station or vice versa; in the affirmative case, a Temporary Block Flow (TBF) is established by the BSC. The TBF establishment determines the allocation of physical radio communications resources of the PLMN 100, i.e. of radio resource(s) on a radio frequency channel, to the mobile station for enabling the exchange of the data packets from the data transfer path through the proper BSC and BTS. Data packets are transferred via physical channels called Packet Data Channels (PDCHs).

When the data packets have been exchanged, the TBF is released and the radio resources are released; provided the PDP context is not deactivated, the BSC waits for new data to be exchanged. Thus, differently from the PDP context, the TBF, i.e. the physical radio communications resources of the PLMN 100, is kept allocated for the mobile station only as long as there is data to be transmitted/received to/from it, and is released as soon as the data has been exchanged, keeping the radio resources free for other uses/users. In other words, a TBF is temporary and is maintained only for the duration of the data transfer.

Thanks to the provision of the GERAN, EGPRS-capable mobile stations can in particular benefit of the enhanced data transfer rates made possible by the EGPRS technology; GPRS-capable mobile stations can instead exchange data at the transfer rate supported by the GPRS standard. Non-GPRS mobile phones can instead only benefit of the CS communication capabilities offered by the PLMN 100 (typically, voice calls, SMS services, and similar).

Figure 2:
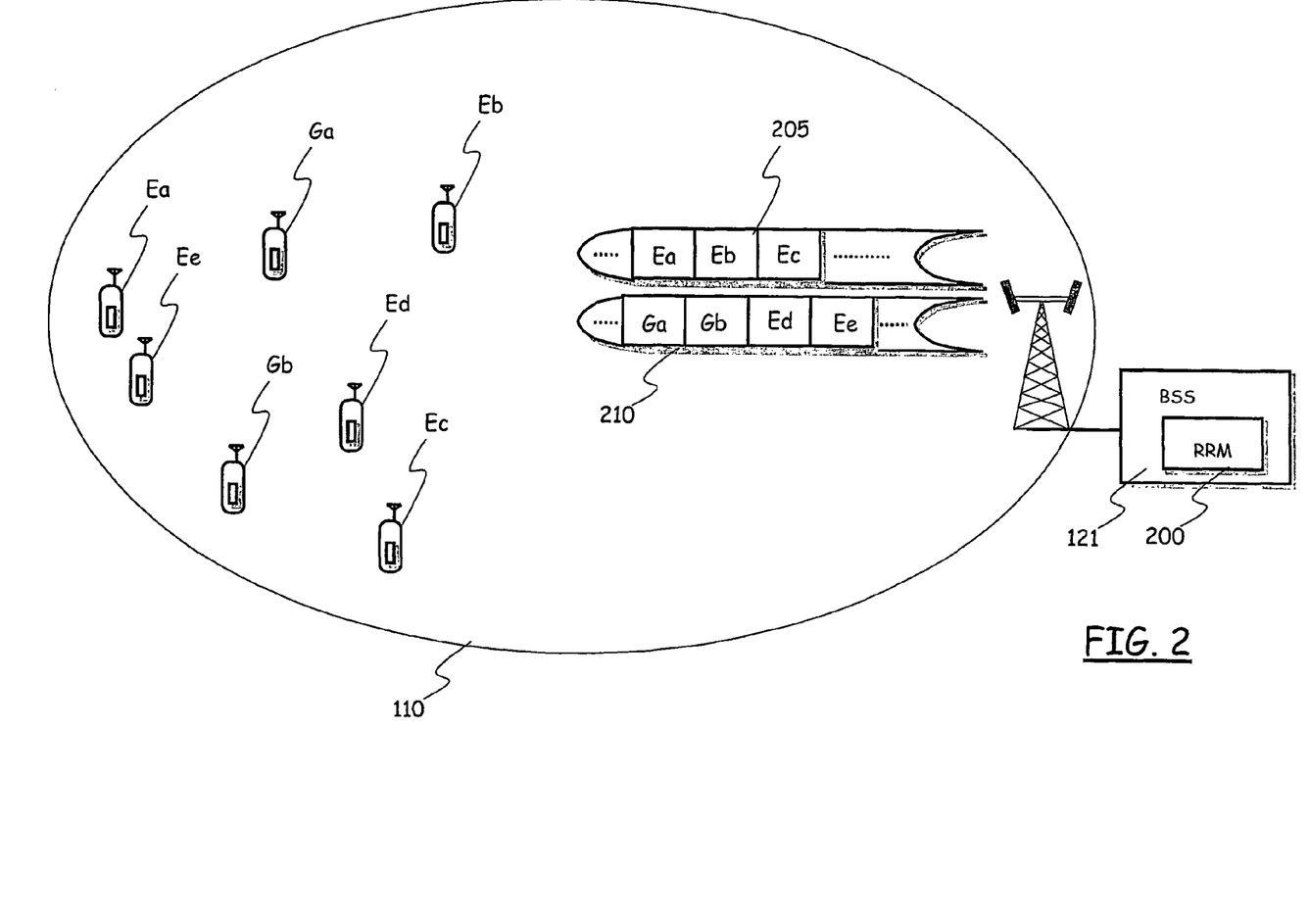
FIG. 2 pictorially shows a GERAN of the network of FIG. 1, with an exemplary allocation of mobile stations on radio bearers.

Reference is now made to FIG. 2, wherein the BSS 121 of the PLMN 100 of FIG. 1 is depicted, with an exemplary allocation of mobile stations on GSM/GPRS/EGPRS radio resources 205; and on GSM/GPRS radio resources 210. In this context, by "GSM/GPRS/EGPRS radio resource" it is intended one or more time slots, in the CS domain, and one or more PDCHs, in the PS domain, supporting both GMSK and 8-PSK modulation; by "GSM/GPRS radio resource" it is intended one or more time slots, in the CS domain, and one or more PDCHs, in the PS domain, that support only GMSK modulation.

Assuming that five EGPRS-capable mobile stations Ea, Eb, Ec, Ed and Ee and two GPRS-capable mobile stations Ga and Gb are present in the network cell 110 and are connected to the network, it is assumed that an RRM unit 200 of the BSS 121 has allocated three of the five EGPRS-capable mobile stations, e.g. the mobile stations Ea, Eb and Ec on the GSM/GPRS/EGPRS radio resources 205, whereas the remaining two EGPRS-capable mobile stations Ed and Ef, for example for reasons of congestion of the GSM/GPRS/EGPRS radio resources, have been allocated on the GSM/GPRS radio resources 210, multiplexed with the GPRS-capable mobile stations Ga and Gb. It is pointed out that this scenario does not pretend to be realistic, and has merely the intent of clarifying the differences between a conventional network behavior and a behavior according to the invention embodiment herein described. In particular, in practice a congestion situation will not be reached for such a small number of mobile stations as that herein considered.

As discussed in the foregoing, conventionally radio resource assignment policies implemented by the BSS 121 allocate mobile stations on EGPRS and GPRS radio bearers based on the EGPRS or GPRS capabilities of the mobile stations (part of the so-called "terminal capabilities"), as declared by the mobile stations upon connecting to the GPRS core network, and on RRM policies directed to optimize the use of radio resources and the management of congestion situations.

This does not allow for implementing policies of restriction of the user access to high-value network services like those potentially made possible by the combined EDGE and GPRS technologies, based for example on specific subscription (and payment).

Hereinafter, a solution is described according to an embodiment of the present invention, that allows the network operator to ensure that users equipped with EGPRS-capable mobile stations, and having subscribed, or paying for a given EGPRS network service, perceive a QoS that is essentially not affected, or at least less affected, by the simultaneous presence of other users not equipped with EGPRS-capable mobile stations, or not having subscribed, or not paying for the EGPRS service.

In particular, according to an embodiment of the present invention, a user discrimination procedure is implemented at the core network level, that allows to discriminate users between the following two user classes:

Class 1: users with EGPRS-capable mobile stations and having subscribed/paid for an EGPRS service; and Class 2: users with EGPRS-capable mobile stations and not being subscribers of an EGPRS service, and users of GPRS-capable mobile stations.

It is pointed out that by users having subscribed/paid for an EGPRS service it is intended users who have a subscription with the network operator enabling them to exploit EGPRS services in general, or users who have subscribed and paid for a specific service that is supported by the EDGE technology only.

Figure 3:
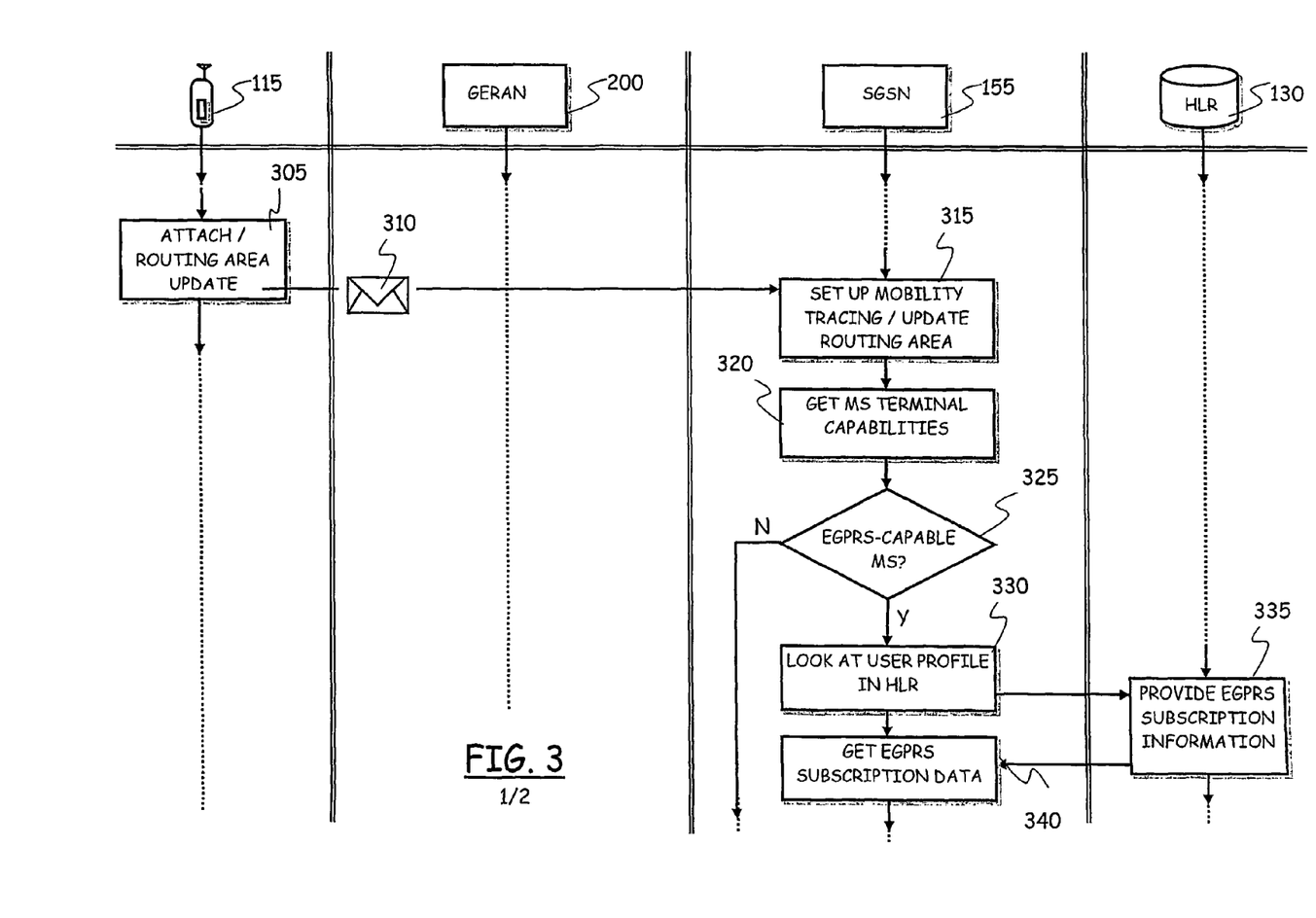
FIG. 3 is a schematic operation flow illustrating the main actions performed by the various involved entities in implementing a method according to an embodiment of the present invention.

Reference is made to FIG. 3, depicting a flow of operations performed by the various players, according to an embodiment of the present invention.

Conventionally, in order to exploit GPRS services, a mobile station performs a so-called "GPRS attach" procedure, which as known is a procedure by means of which the mobile station informs the network of its presence, in order to allow the network to trace the mobility thereof, or, if the GPRS attach procedure has already been performed, the mobile station performs a so-called "routing area update" procedure when a new cell, belonging to a different routing area, is entered (block 305). By "routing area" it is intended a logical group of cells, under competence of a certain SGSN and BSC, where paging of the mobile station in standby state is performed by the network.

As prescribed in the 3GPP Technical Specification TS 24.008, the mobile station sends an attach request or a routing area update request message 310. Conventionally, the attach request or routing area update request message 310 includes several different parameters, like the IMSI (International Mobile Subscriber Identity) or the P-TMSI (Packet-Temporary MSI) (only the latter one for a routing area update request message), the GPRS CKSN (Ciphering Key Sequence Number), the attach or update type, respectively, the DRX (Discontinuous Reception) parameter, and classmark parameters. In particular, the classmark parameters include a mobile station radio access capability information element and a mobile station network capability information element. The mobile station network capability information element includes information specifying whether the mobile station complies or not with the 3GPP standard release R99 (or later). The mobile station radio access capability information element includes information for the GERAN which affects the way the GERAN manages the assignment of radio resources to the mobile station; in particular, the mobile station radio access capability information element includes information specifying whether the mobile station supports EGPRS or not.

The SGSN receives the attach request or a routing area update request message 310, and accordingly sets up the mobile station mobility tracing procedure, or performs the routing area update for the mobile station (block 315).

In particular, according to the 3GPP Technical Specification TS 08.18, the SGSN is responsible of forwarding the mobile station radio access capability information to the GERAN, particularly to the BSS (over the Gb interface), so as to enable a Radio Link Control (RLC)/Medium Access Control (MAC) layer unit in the BSS to treat in the proper way the mobile station.

According to an embodiment of the present invention, the SGSN gets the mobile station radio access capability information from the attach request or a routing area update request message 310 (block 320), and checks whether the mobile station declares itself as EGPRS-capable (decision block 325).

In the negative case (decision block 325, exit branch N), i.e. in case the mobile station is GPRS-capable only, the SGSN conventionally forwards the mobile station radio access capabilities to the GERAN (block 355), together with an identifier of the mobile station (conventionally referred to as the TLLI) in a standard RA-CAPABILITY PDU message 360.

In case instead the SGSN assesses that the mobile station declares itself as EGPRS-capable (decision block 325, exit branch Y), the SGSN looks at the user profile in the HLR 130 (block 330). Conventionally, the user profile in the HLR includes a Network Access Module (NAM) parameter 170 (FIG. 1), that has a field 175 adapted to specify whether the user is a GSM subscriber, and a field 180 specifying whether the user is a GPRS subscriber (the two fields 175 and 180, in combination, allows specifying whether the user is both a GSM and a GPRS subscriber). According to an embodiment of the present invention, a further field 185 is included in the NAM 170, adapted to identify the user as an EGPRS subscriber, i.e., a user who has subscribed for benefiting of EGPRS services, or a user who has paid for a specific EGPRS service.

The HLR provides the SGSN with the requested EGPRS subscription information (block 335).

The SGSN gets the EGPRS subscription information (block 340), and, in case the user is actually a subscriber of the EGPRS services (exit branch Y of decision block 345), the SGSN conventionally forwards the mobile station radio access capabilities to the GERAN (block 355), in the standard RA-CAPABILITY PDU message 360.

If, on the contrary, the SGSN ascertains that the user is not a subscriber to the EGPRS services (exit branch N of decision block 345), the SGSN changes the mobile station radio access capability information provided by the mobile station into "GPRS-capable", overriding the information provided by the mobile station (block 350), and then sends (block 355) the modified mobile station radio access capability information to the GERAN in the RA-CAPABILITY PDU message 360.

The GERAN receives the RA-CAPABILITY PDU message 360 from the SGSN (block 365), with the original or modified mobile station radio access capability information, and accordingly allocates radio resources for the mobile station (block 370).

In particular, once the GPRS attach procedure, or the routing area update procedure has been performed, the mobile station performs a one-phase or two-phase access to the network, in order to get the set-up of proper radio resources (the TBF) on the uplink and/or on the downlink, to support data transfer.

In other words, according to an embodiment of the present invention, the SGSN can mask the radio access capability information provided by the mobile station, so that if a mobile station, even if EGPRS capable, belongs to a user who is not a subscriber of EGPRS services, the network will treat it as a GPRS-capable mobile station.

This allows for differentiating the treatment of users having EGPRS-capable mobile stations: user having EGPRS-capable mobile stations and having subscribed for EGPRS services will be allocated EGPRS radio resources, and will take advantage of the increased transmission rates allowed by the EGPRS technology. User having EGPRS-capable mobile stations but having not subscribed for EGPRS services will not be allocated EGPRS radio resources, and will instead be treated as users of GPRS-capable mobile stations.

In this way, the network operator may ensure a relatively constant, minimum predetermined QoS to users of EGPRS-capable mobile stations who have subscribed for EGPRS services.

It can be appreciated that the implementation of the above-described embodiment of the invention has a very limited impact on the deployed network, because it is sufficient to provide, in the HLR, a field adapted to specify whether a generic user is a subscriber of EGPRS network services, and to limitedly change the way the SGSN operates (a change to the software/firmware is sufficient). In the invention embodiment described in the foregoing, the structure and operation of the GERAN, particularly of the BSS needs not be modified.

It is pointed out that, according to the standard, during the set-up of a TBF, the mobile station may provide the GERAN, particularly the (RLC/MAC of the) BSS, with additional mobile station radio access capability information that includes the mobile station radio access capability information element initially sent to the SGSN (conventionally, there is no reason why the two indications differ). In such a case, according to an embodiment of the present invention, the GERAN may be adapted to compare the mobile station radio access capability information directly received from the mobile station with that received from the SGSN, and, in case they differ, to rely on the information received from the SGSN.

In alternative embodiments of the invention, it may be provided that the GERAN, particularly the BSC, implements specific RRM policies adapted to ensure that users of EGPRS-capable mobile stations, but not subscriber of EGPRS services, are not plainly treated as users of GPRS-capable mobile stations, trying instead to guarantee to such non-subscriber EGPRS-capable users better performances than those offered to GPRS-capable users, without however penalizing the QoS of subscriber EGPRS-capable users. For example, the SGSN may in this case not simply substitute the "EGPRS-capable" information with the "GPRS-capable" information, but make a distinction between EGPRS-capable subscriber users, EGPRS-capable non-subscriber users, and plain GPRS-capable users. In this way, a user discrimination procedure may be implemented at the core network level, that allows to discriminate users among the following three user classes:

Class 1: users with EGPRS-capable mobile stations and having subscribed/paid for an EGPRS service;
Class 2: users with EGPRS-capable mobile stations and not being subscribers of an EGPRS service, and
Class 3: users of GPRS-capable mobile stations.

In particular, in case it is provided that, during the set-up of a TBF, the mobile station may provide the GERAN, particularly the (RLC/MAC of the) BSC, with additional mobile station radio access capability information that includes the mobile station radio access capability information element initially sent to the SGSN, the BSC can identify the users that, although having EGPRS-capable mobile stations, are not subscribers of EGPRS services as those users corresponding to connections for which the BSC has received discordant mobile station radio access capability information from the SGSN (after the masking operation described in the foregoing) and directly from the mobile station. A parameter may accordingly be defined at the GERAN (BSC) level, on which specific RRM policies may be based.

In further alternative embodiments of the invention, an ad-hoc network function, e.g. an ad-hoc GPRS network entity may be provided, inserted for example between the BSC and the BTS (active on the Abis interface), adapted to capture classmark messages and to modify it as described in the foregoing (exploiting for example information included in the user profile in the HLR).

According to still an alternative embodiment of the present invention, a discrimination among EGPRS-capable mobile stations of EGPRS subscribers, EGPRS-capable mobile stations of non-EGPRS-subscribers, and GPRS-capable mobile stations may be based on the standard QoS management (3GPP TS 23.107, incorporated herein by reference).

As known to those skilled in the art, the GPRS standard allows for defining a specific QoS profile for each PDP context, in order to enable the definition of application-specific network (particularly radio) parameters for the various possible applications.

In particular, in the standard the QoS profile is defined as a set of parameters including the maximum bit rate, the guaranteed bit rate, the transfer delay, etc. The generic mobile station sends the QoS profile in an ACTIVATE PDP CONTEXT request message. The QoS profile, possibly negotiated by the SGSN and the GGSN, is then communicated to the mobile station, in an ACTIVATE PDP CONTEXT ACCEPT response message. The QoS profile is also provided to the GERAN, particularly to the BSC, wherein it is used to determine the radio resource assignment mechanisms adapted to ensure the fulfillment of the requirements specified in the QoS profile.

In particular, the standard sets forth four possible QoS profiles, referred to as "conversational", "streaming", "interactive" and "background", in decreasing order of performance to be guaranteed.

According to an embodiment of the present invention, the QoS profiles "streaming", "interactive" and "background" may be exploited to differentiate users in the above-specified three classes Class 1, Class 2 and Class 3.

For example, as described in connection with the first embodiment herein presented, the SGSN receives the mobile station radio access capability information, accesses the HLR and checks the user profile stored therein. If the user has an EGPRS-capable mobile station and is a subscriber of EGPRS services, the SGSN activates a PDP context characterized by the "streaming" QoS profile. If, instead, the user has an EGPRS-capable mobile station but is not subscriber of the EGPRS services, the SGSN activates the "interactive" QoS profile, whereas users of GPRS-capable mobile stations are provided with services characterized by the "background" QoS. In this way, not only it is guaranteed that the EGPRS subscribers are provided with services with a specified bit rate and transfer delay, and thus a guaranteed minimum perceived QoS, but it is also made possible to differentiate non-subscriber users of EGPRS-capable mobile stations from users of GPRS-capable mobile stations, giving to the former better performance than the latter.

The GERAN conventionally uses the QoS profiles for managing the assignment of the radio resources to the different mobile stations.

Thanks to the invention embodiment described in the foregoing, the network operator is enabled to ensure that the quality of service perceived by the users complies with what the users pay for the services. In particular, in a network scenario in which users can benefit of both a GPRS and an EGPRS radio coverage, the solution proposed allows for ensuring that users with EGPRS-capable mobile stations, and with an EGPRS service subscription, benefit of an absolute priority on the use of EGPRS radio resources compared to all the other terminals. In particular, the network operator may decide that only the users with EGPRS-capable mobile stations and having an EGPRS service subscription can have access to EGPRS radio resources; the network operator can alternatively allow users of EGPRS-capable mobile stations without an EGPRS subscription to benefit of the EGPRS radio resources, using available EGPRS radio resources, but without affecting the performance of the EGPRS-capable mobile stations of the users who have an EGPRS subscription. The solution according to the present invention has a very limited impact to the architecture and apparatuses of an existing mobile communications network, because it may be implemented in terms of a relatively simple application software that can readily be integrated in the existing network functionalities.

Although the present invention has been disclosed and described by way of some embodiments, it is apparent to those skilled in the art that several modifications to the described embodiments, as well as other embodiments of the present invention are possible without departing from the scope thereof as defined in the appended claims.

In particular, the discrimination of users based on the service/radio capability may be applied to different types of wireless networks. Several different wireless network radio access systems are based on similar radio techniques: for instance, HSDPA High Speed Downlink Packet Access) is based on a common channel that is shared at least on time basis among several users. From the radio viewpoint, HSDPA implements both QPSK as UMTS and 16-QAM (Quadrature Amplitude Modulation), a modulation technique that allows for reaching very high bit rates. A technique known as AMC (Adaptive Modulation and Coding) dynamically changes the MCS to compensate the channel variations: depending on the radio quality perceived by the user and communicated by the terminal to the network, the network decides the transmission format and then the modulation to be used; the decision on the modulation and coding to be chosen is taken on the basis of the feedback received from the UE and named CQI (Channel Quality Indicator). This allows the full exploitation of the 16-QAM modulation. UMTS R99, based on a Wideband Code Division Multiple Access (WCDMA) scheme, uses a constant modulation scheme (QPSK), with fast power control to follow and to adapt the transmission to the changes in channel conditions.

For example, if a user is experiencing favorable channel conditions, a high order modulation scheme such as 16-QAM with $R=3/4$ code rate may be used to maximize throughput for this user. On the other hand, if the channel conditions are poor, QPSK with $R=1/4$ code rate can be used to provide higher reliability in the transmission. The UE is then scheduled by the Node B (the UMTS counterpart of the BSC), where the final selection of the MCS level and channelization-code set is performed.

According to a possible embodiment of the present invention, it would be possible to associate to the two (or possibly more) different modulation schemes two different levels of user subscriptions. The network will thus be able to decide the allocation of radio resources exploiting a certain modulation scheme not only as a function of the radio capability of the terminal and the radio quality perceived at the receiver, but also on the basis of the service subscription of the final user.

In other words, thanks to the present invention, it is possible to selectively assign different radio resources to users based on different levels of subscription.

The invention claimed is:

1. A method of operating a wireless communications network for providing services to users exploiting first and second different radio communication technology technologies, the first radio communication technology having a higher access capability than the second radio communication technology, the method comprising:
providing, in a user profile available at the wireless communications network, a subscription indication indicating that the user has subscribed to services using the first radio communication technology;
upon reception by the wireless communications network of a capability indication from the user indicating to the wireless communications network that the user supports the first radio communication technology:
determining if the user has subscribed to services using the first radio communication technology based on the subscription indication;
forwarding the capability indication to a network device to allow an access capability according to the first radio communication technology when it is determined that the user has subscribed to services using the first radio communication technology; and
overriding the capability indication with an access capability according to the second radio communication technology and forwarding the overridden capability indication to the network device to provide services to the user using the second radio communication technology instead of the first radio communication technology when it is determined that the user has not subscribed to services using the first radio communication technology.

2. The method according to claim 1, wherein the wireless communications network comprises an enhanced general packet radio service public land mobile network, for providing enhanced general packet radio service network services to users, wherein said enhanced general packet radio service network services comprise services provisioned by means of enhanced data rates for global evolution radio resources.

3. The method of claim 2, wherein said user profile is stored in a home location register of the public land mobile network.

4. The method of claim 2, wherein said capability indication comprises an enhanced data rates for global evolution capability indication, indicating to the wireless communications network that the user supports enhanced data rates for global evolution communications.

5. The method of claim 4, wherein said enhanced general packet radio service capability indication is received by a serving general packet radio service support node of the wireless communications network.

6. The method of claim 5, wherein said enhanced general packet radio service capability indication is in an attach request or routing area update request message sent by the user and received by the serving general packet radio service support node.

7. The method of claim 6, wherein said enhanced general packet radio service capability indication is part of classmark parameters in said attach request or routing area update request message.

8. The method of claim 5, wherein said handling of the user as if not supporting the enhanced general packet radio service services comprises having the serving general packet radio service support node:
override the enhanced general packet radio service capability indication received from the user with an indication of enhanced general packet radio service incapability; and
provide a radio access network part with the indication of enhanced general packet radio service incapability for said user, wherein the radio access network part uses the indication of enhanced general packet radio service incapability as a guidance for the allocation of radio resources to the user.

9. The method of claim 8, wherein said indication of enhanced general packet radio service incapability comprises having the serving general packet radio service support node send the radio access network part a RA-CAPABILITY PDU message to a radio access network part.

10. The method of claim 2, wherein said capability indication comprises a quality of service profile communicated by the user in an activate packet data protocol context request sent to the wireless communications network.

11. The method of claim 10, wherein said quality of service profile is received by a serving general packet radio service support node of the wireless communications network.

12. The method of claim 11, wherein said handling comprises:
assigning the user a quality of service profile different from a quality of service profile assigned to a user supporting enhanced general packet radio service services and having subscribed for them.

13. The method of claim 12, wherein said handling further comprises delivering the assigned quality of service profile to a radio access network part for the allocation of radio resources to the user.

14. The method of claim 13, wherein the assigned quality of service profile is delivered in an activate packet data protocol context accept response to the user.

15. A wireless communications network for providing services to users exploiting first and second different radio communications technologies, the first radio communication technology having a higher access capability than the second radio communication technology, comprising:
a user profile comprising a subscription indication, indicating that the user has subscribed to wireless communications network services using the first radio communication technology;
wherein the wireless communications network, upon reception of a capability indication from the user indicating to the wireless communications network that the user supports the first radio communications technology:
determines if the user has subscribed to services using the first radio communication technology based on the subscription indication;
forwards the capability indication to a network device to allow an access capability according to the first radio communication technology when it is determined that the user has subscribed to services using the first radio communication technology; and
overrides the capability indication with an access capability according to the second radio communication technology and forward the overridden capability indication to the network device to provide services to the user using the second radio communications technology instead of the first radio communications technology when it is determined that the user has not subscribed to services using the first radio communication technology.

16. The wireless communications network of claim 15, comprising an enhanced general packet radio service public land mobile network for providing enhanced general packet radio service network services to users, wherein said enhanced general packet radio service network services comprise services provisioned by means of enhanced data rates for global evolution radio resources.

17. The wireless communications network of claim 16, wherein said user profile is stored in a home location register of the public land mobile network.

18. The wireless communications network of claim 17, wherein said capability indication comprises an enhanced data rates for global evolution capability indication, indicating to the wireless communications network that the user supports enhanced data rates for global evolution communications.

19. The wireless communications network of claim 18, wherein said enhanced general packet radio service capability indication is received by a serving general packet radio service support node of the wireless communications network and is in an attach request or routing area update request message sent by the user and received by the serving general packet radio service support node.

20. The wireless communications network of claim 19, wherein said enhanced general packet radio service capability indication is part of classmark parameters in said attach request or routing area update request message.

21. The wireless communications network of claim 19, wherein the serving enhanced general packet radio service support node:

overrides the enhanced general packet radio service capability indication received from the user with an indication of enhanced general packet radio service incapability; and provides a radio access network part with the indication of enhanced general packet radio service incapability for said user, wherein the radio access network part uses the indication of enhanced general packet radio service incapability as a guidance for the allocation of radio resources to the user.

22. The wireless communications network of claim 21, wherein the serving general packet radio service support node sends said indication of enhanced general packet radio service incapability to the radio access network part in a RA-CAPABILITY PDU message thereto.

23. The wireless communications network of claim 16, wherein said capability indication comprises a quality of service profile communicated by the user in an activate packet data protocol context request sent to the wireless communications network, and received by a serving general packet radio service support node of the wireless communications network.

24. The wireless communications network of claim 23, further comprising:

assigning the user a quality of service profile different from a quality of service profile assigned to a user supporting enhanced general packet radio service services and having subscribed for them, wherein the assigned quality of service profile is delivered to a radio access network part for the allocation of radio resources to the user.

25. The wireless communications network of claim 24, wherein the assigned quality of service profile is delivered in an activate packet data protocol context accept response to the user.

* * * * *

UNITED STATES PATENT AND TRADEMARK OFFICE
CERTIFICATE OF CORRECTION

PATENT NO.      : 8,472,966 B2
APPLICATION NO. : 12/087266
DATED           : June 25, 2013
INVENTOR(S)     : Franceschini et al.

It is certified that error appears in the above-identified patent and that said Letters Patent is hereby corrected as shown below:

In the Claims

Claim 1, col. 13, line 12, "communication technology technologies" should read -- communication technologies --.

Signed and Sealed this
Twenty-fourth Day of September, 2013

Teresa Stanek Rea
*Deputy Director of the United States Patent and Trademark Office*